United States Patent [19]

Lechner et al.

[11] Patent Number: 4,852,159
[45] Date of Patent: Jul. 25, 1989

[54] CIRCUIT ARRANGEMENT FOR A MODULE IN THE EXCHANGE OF A DIGITAL TDM TELECOMMUNICATIONS NETWORK

[75] Inventors: Robert Lechner, Sankt Poelten, Austria; Manfred Drescher, Fuerstenfeldbruck, Fed. Rep. of Germany

[73] Assignee: Siemens Aktiengesellschaft, Berlin and Munich, Fed. Rep. of Germany

[21] Appl. No.: 210,066

[22] Filed: Jun. 22, 1988

[30] Foreign Application Priority Data

Jul. 3, 1987 [DE] Fed. Rep. of Germany ....... 3722121

[51] Int. Cl.⁴ .............................................. H04B 3/20
[52] U.S. Cl. .................................... 379/402; 379/410; 370/32.1
[58] Field of Search ............... 379/345, 346, 405, 402, 379/399, 414, 415, 416, 410; 370/32, 32.1

[56] References Cited

U.S. PATENT DOCUMENTS 4,628,157 12/1986 Chance et al. ...................... 379/410

Primary Examiner—James L. Dwyer
Attorney, Agent, or Firm—David N. Caracappa, Esq.

[57] ABSTRACT

A circuit arrangement for a module in the line-connection section of a digital time-multiplex telecommunication network is disclosed. The module contains, among other things, a transverse filter to perform a two-wire/four-wire conversion and is connected through a transformer to the wires of a subscriber line. In order to compensate for phase distortions caused by reflection of signals from the transformer back to the module, the corresponding signals coming from the module are subjected to an equal and opposite phase pre-distortion. This optimizes the hybrid circuit attenuation.

3 Claims, 1 Drawing Sheet

FIG.
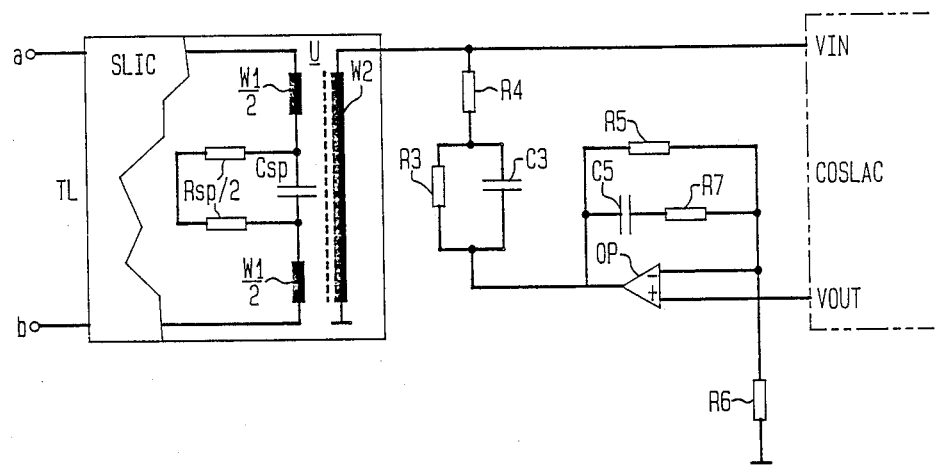

CIRCUIT ARRANGEMENT FOR A MODULE IN THE EXCHANGE OF A DIGITAL TDM TELECOMMUNICATIONS NETWORK

The invention concerns a circuit arrangement for a module performing the functions of analog-digital conversion, digital-analog conversion, filtering and two-wire/four-wire conversion (the latter with the aid of a digital transverse filter), which circuit arrangement is connected by means of a transformer to the wires of a subscriber line in a digital TDM telecommunications network.

Modules of the above-mentioned kind, for which designations such as COSLAC and SICOFI are used, are designed for practical purposes in such a manner that the functions which they perform can be programmed. In other words, they can be adjusted through software commands to the existing circumstances, which gives them universal application.

With the above-mentioned transformer, it is possible to make a balanced connection to the a and b wires of a subscriber line from the unbalanced analog input and output terminals of the module. In addition, the analog subscriber sets connected to the subscriber line can be fed remotely through this transformer.

The analog signals which reach the transformer from the analog signal output terminal of such a module are, to some extent, reflected and arrive back at the analog signal input terminal of the module. In doing so, they also undergo a non-linear distortion of their group delay. That is, components of the reflected signal at different frequencies are subjected in differing degrees to a phase shift, which is inversely proportional to the value of the primary inductance of the transformer. Frequencies in the lower range of the voice transmission band are particularly affected. The compensation of the above-mentioned signal components, which must take place in the course of the two-wire/four-wire switching referred to above, causes the hybrid circuit attenuation to become less complete or smaller, the greater the distortion of the group delay turns out to be. Thus, in order to secure good hybrid circuit attenuation, a transformer with the greatest possible primary inductance must be used, which, however, is contrary to the general requirement that the transformer be as small as possible.

The purpose of the invention is, thus, to describe a circuit arrangement which permits the use of small transformers, while simultaneously providing a sufficiently good hybrid circuit attenuation.

In accordance with principles of the present invention, this purpose is accomplished by a circuit arrangement of the type referred to in the general description above, which is placed between the output terminal of the module and the transformer and effects a pre-distortion of the group delay of the signals that reach it through the transformer in such a manner that the distortion of the group delay which these signals undergo in the course of their partial reflection at the transformer back to the input of the module is exactly reversed.

Since the circuit arrangement according to the invention effects a compensation of the phase distortions that occur when the signals reaching the transformer from the module are reflected, the transformer can be designed with a view to optimizing the hybrid circuit attenuation to be as small as the other circumstances permit.

According to another aspect of the invention, the above-mentioned circuit arrangement consists of an operational amplifier functioning as a non-inverting amplifier. The operational amplifier has a non-inverting input terminal which is connected to the output terminal of the module, and an output terminal which is connected to a winding of the transformer. A feedback network is connected between the output and inverting input terminals of the operational amplifier, whose characteristics determine the above-mentioned amplifying function, and effects the desired phase pre-distortion.

According to yet another aspect of the invention, the feedback network consists of a serial RC network, connected between the output terminal of the operational amplifier and its inverting input terminal, which, together with a first resistance connecting the output and the inverting input terminals and a second resistance connecting the inverting input terminal to a source of a reference voltage, effects the desired phase distortion.

The single FIGURE is a diagram of the circuit of the invention.

The invention is described in greater detail below with the aid of an embodiment, making reference to the drawing.

The drawing shows at the left side an interface modular unit SLIC, which constitutes the interface to the wires a and b of a subscriber line TL in a digital TDM telecommunications network, and which contains, among other elements, resistances Rsp/2, a capacitor Csp of a supply side bridge, and a transformer U with windings W1/2 and W/2. On the right side of the drawing is shown a COSLAC module, which contains elements (not shown) which perform, among other things, the analog-digital conversion of analog signals from analog signal input terminal VIN coming from the subscriber line TL through the transformer U; and digital-analog conversion of digital signals coming from a switching matrix of an exchange of a digital TDM telecommunications network, which then appear as analog signals at the output terminal VOUT. The COSLAC module also performs filtering functions and two-wire/four-wire conversion from the two-wire subscriber line to the four-wire signal path through the switching system. For this purpose a digital transverse filter is used.

The FIGURE also shows an operational amplifier OP, whose non-inverting input terminal is connected to the analog signal output terminal VOUT of the COSLAC module, and whose output terminal is connected to the transformer U through a parallel RC circuit containing resistance R3 and capacitor C3 and through a resistance R4 in series with it.

In addition, the output terminal of the operational amplifier OP is connected through a resistance R5 to the inverting input terminal of the operational amplifier. This inverting input terminal is connected through a resistance R6 to a source of a reference voltage. To this extent the operational amplifier constitutes a non-inverting amplifier which serves as drive amplifier for the analog signals supplied from the COSLAC module to the transformer U. The terminal of the resistance R4 that is connected to a winding of the transformer is also connected to the analog signal input terminal VIN of the COSLAC module. The loop formed in this manner between the analog signal output terminal VOUT and the analog signal input terminal VIN, in which the elements R3, R4 and C3 form a reference impedance is, together with a programmable filter, which is likewise an element of the COSLAC unit (not shown) determines the input impedance of the module.

The analog signals which are emitted through the output terminal VOUT of the COSLAC module, and which should reach the two-wire subscriber line TL in the most complete state possible, are in part reflected at the transformer U and returned again to the analog signal input terminal VIN of the COSLAC module. The digital transverse filter contained in the COSLAC module ensures that these reflected signals are largely compensated for, and thus do not reach the outgoing part of the four-wire signal path. That is, they do not arrive at the switchback matrix of the switching system. The phase distortions, mentioned above, which the reflected signals undergo, and which are inversely proportional to the primary inductance of the transformer U, reduce the completeness of this compensation and the attenuation of the hybrid circuit. The output terminal of the operational amplifier OP and its inverting input terminal are also connected to one another through a circuit containing in series a capacitor C5 and a resistance R7. These last-mentioned elements, together with the above-mentioned resistances R5 and R6, are dimensioned in such a maner that the analog signals arriving at the transformer U from the analog signal output terminal VOUT of the COSLAC unit through the operational amplifier undergo a phase distortion which is the inverse of that which occurs when the analog signals are reflected from the transformer U. There, thus, takes place, as the result of the circuit arrangement according to the invention, a compensation of the phase distortions, so that such phase distortions need not be taken into account in dimensioning the transformer U. The transformer U may, therefore, have a relatively small primary inductance and, accordingly, a relatively small size, as the other circumstances permit.

What we claim is:

1. A digital time-multiplex telecommunications network, comprising:
   a module, having an input and an output terminal, for performing the functions of analog-digital conversion, digital-analog conversion, filtering and two-wire/four-wire conversion;
   a transformer, coupled to said module and to wires of a subscriber line in said digital time-multiplex telecommunications network; and
   a circuit arrangement, coupled between said output terminal of said module and said transformer, for effecting a pre-distortion of the group delay of signals passing through it to said transformer in such a manner that said pre-distortion of the group delay is exactly the inverse of the distortion which these signals undergo when they are partially reflected from said transformer back to said input terminal of said module.

2. The network of claim 1, wherein said circuit arrangement comprises:
   an operational amplifier, having a non-inverting input terminal coupled to said output terminal of said module, an output terminal coupled to a winding of said transformer and an inverting input terminal, for functioning as a non-inverting amplifier; and
   a feedback network, coupled between said output terminal and said inverting input terminal of said amplifier, whose characteristics, together with the wiring of the inverting input terminal, which determines said amplifier function, effects said group delay phase pre-distortion.

3. The network of claim 2, wherein said feedback network comprises a serial RC network, coupled between said output terminal and said inverting input terminal of said amplifier, which, together with a first resistance coupled between said output terminal and said inverting input terminal of said amplifier, and a second resistance coupled between said inverting input terminal and a source of a reference voltage, effects said group delay pre-distortion.

* * * * *